UNITED STATES PATENT OFFICE.

GEORG KALISCHER, OF MAINKUR, NEAR FRANKFORT-ON-THE-MAIN, AND DETLEV NISSEN, OF FRANKFORT-ON-THE-MAIN, GERMANY, ASSIGNORS TO CASSELLA COLOR COMPANY, A CORPORATION OF NEW YORK.

VAT DYES AND PROCESS OF MAKING SAME.

1,129,574.  Specification of Letters Patent.  Patented Feb. 23, 1915.

No Drawing.   Application filed June 18, 1914.  Serial No. 845,836.

*To all whom it may concern:*

Be it known that we, GEORG KALISCHER, Ph. D., a subject of the King of Prussia, residing at Waldstrasse 23, Mainkur, near Frankfort-on-the-Main, and DETLEV NISSEN, Ph. D., a subject of the King of Prussia, residing at Habsburger Allee 63, Frankfort-on-the-Main, Germany have invented certain new and useful Improvements in Vat Dyes and Processes of Making Same, of which the following is a full description.

We have discovered that by heating 1.amino.2.methlyanthraquinone with sulfur to an elevated temperature in the presence of a suitable aromatic amin, valuable new vat dyestuffs of good fastness are obtained. The new dyestuffs are entirely different in their chemical reactions and in their tinctorial properties from the known dyestuff obtained by heating 1.amino.2.methylanthraquinone alone with sulfur. While the latter color dyes cotton brown shades, a product yielding intensive violet shades is obtained by melting with the addition of p-phenylenediamin and again a dyestuff yielding claret shades results when melting with the addition of benzidin. The fact, that the character of the amin employed substantially affects the character of the resulting dyestuff, proves that the amin forms an essential part of the molecule of the dyestuff. The quantity of the amin may be varied considerably. In place of aromatic polyamins, any substances may be used which like nitro or azo compounds yield polyamino compounds on reduction.

The new dyestuffs are dark powders, insoluble in water, soluble in concentrated sulfuric acid with a brown to olive color which, on the addition of paraformaldehyde, turns into a greenish blue. They yield with hydrosulfite and caustic soda lye brownish red to violet colored vats, dyeing cotton red to violet shades fast to washing, chlorin and light.

The process of working is illustrated by the following example:

Example: A mixture of 15 kilos 1.amino.2.methylanthraquinone, 5 kilos p-phenylenediamin and 75 kilos sulfur is heated for three hours to 200–210° C., and subsequently for another four hours to about 230° C. After cooling down the melt is powdered and any excess of sulfur is removed by treating with a hot solution of sodium sulfid. The resulting dyestuff, when dried, is a violet-brown powder, very difficultly soluble in organic dissolving agents of a high boiling point. In concentrated sulfuric acid the dyestuff yields a brownish-olive solution, the shade of which turns to greenish blue on the addition of paraformaldehyde. With hydrosulfite and caustic soda lye a violet vat is formed which dyes cotton intensively violet shades. The same dyestuff is obtained, if instead of p-phenylenediamin p-nitranilin or p-aminoazobenzene is heated with 1.amino.2.methylanthraquinone and sulfur.

Dyestuffs of similar properties are obtained by using other polyamins (or the corresponding nitro- or azo-bodies). For instance the dyestuff obtained with m-nitranilin dyes claret; with chlor-m-phenylenediamin (Cl:NH$_2$:NH$_2$=1:2:4) it dyes claret, with m-toluylenediamin (CH$_3$:NH$_2$:NH$_2$=1:2:4) it dyes brownish-red, with 2.7.naphthylenediamin it dyes reddish violet, with 1.5 naphthylenediamin it dyes brownish violet, with nitro-p-phenylenediamin it dyes violet, with benzidin it dyes claret.

Having now particularly described and ascertained the nature of our said invention and in what manner the same is to be performed, we declare, that what we claim is:

1. Process of producing new vat dyestuffs which consists in heating 1.amino.2.methylanthraquinone with sulfur in the presence of aromatic polyamins, the dyestuffs thus obtained being dark powders soluble in concentrated sulfuric acid with a brown to olive color which on the addition of paraformaldehyde is changed into greenish blue, yielding brownish-red to violet vats with hydrosulfite and caustic soda lye, dyeing cotton red to violet shades, substantially as described.

2. Process of producing a new vat dyestuff which consists in heating 1.amino.2.-methylanthraquinone with sulfur in the presence of p-phenylenediamin, the dyestuff thus obtained being a violet-brown colored powder soluble in concentrated sulfuric acid with a brownish-olive color which on the addition of paraformaldehyde is changed into greenish blue, yielding a violet vat with hydrosulfite and caustic soda lye, dyeing cotton intensively violet shades, substantially as described.

3. The herein described new vat dyestuffs obtained by heating 1.amino.2.methylanthraquinone with sulfur in the presence of aromatic polyamins, the said dyestuffs being dark powders, soluble in concentrated sulfuric acid with a brown to olive color which on the addition of paraformaldehyde is changed into greenish blue, yielding brownish-red to violet vats with hydrosulfite and caustic soda lye which dye cotton red to violet shades, substantially as described.

4. The herein described new vat dyestuff obtained by heating 1.amino.2.methylanthraquinone with sulfur in the presence of p-phenylenediamin, the said dyestuff being a violet-brown colored powder, soluble in concentrated sulfuric acid with a brownish olive color which on the addition of paraformaldehyde is changed into greenish blue, yielding a violet vat with hydrosulfite and caustic soda lye which dyes cotton intensively violet shades, substantially as described.

In witness whereof we have hereunto signed our names this 4th day of June 1914, in the presence of two subscribing witnesses.

Dr. GEORG KALISCHER.
Dr. DETLEV NISSEN.

Witnesses:
JEAN GRUND,
CARL GRUND.